United States Patent [19]
Litvin et al.

[11] Patent Number: 6,128,969
[45] Date of Patent: Oct. 10, 2000

[54] HYBRID GEAR DRIVE

[75] Inventors: Faydor L. Litvin, Skokie; Aleksandar Egelja, Wheaton, both of Ill.; Inhwan Seol, Taljeon, Rep. of Korea

[73] Assignee: Board of Trustees of the University of Illinois, Urbana, Ill.

[21] Appl. No.: 09/076,691

[22] Filed: May 12, 1998

[51] Int. Cl.[7] .............................. F16H 1/16; F16H 55/08; F16H 55/22

[52] U.S. Cl. ................................ 74/458; 74/416; 74/425; 74/462; 244/17.11; 416/170 R

[58] Field of Search ............................ 74/416, 425, 458, 74/462; 244/17.11; 416/134 A, 170 R

[56] References Cited

U.S. PATENT DOCUMENTS

| | | | |
|---|---|---|---|
| 1,136,069 | 4/1915 | Weaver | 74/459.5 |
| 1,683,758 | 9/1928 | Candee et al. | 74/458 |
| 1,694,028 | 12/1928 | Wildhaber | 74/458 X |
| 2,954,704 | 10/1960 | Saari | 74/466 |
| 3,768,326 | 10/1973 | Georgiev et al. | 74/458 X |
| 4,744,263 | 5/1988 | Kuiken | 74/462 |
| 4,899,609 | 2/1990 | Nagata | 74/462 |
| 5,149,311 | 9/1992 | Luijten | 74/420 X |
| 5,271,289 | 12/1993 | Baxter, Jr. | 74/462 |
| 5,537,889 | 7/1996 | Shigeura et al. | 74/462 X |

OTHER PUBLICATIONS

Article entitled "Cylkro Gears®— A New Challenge", Guus Basstein, 4 pages, 1994.

Article entitled "Computer Methods In Applied Mechanics and Engineering", I. H. Seol and F. L. Litvin, Department of Mechanical Engineering, University of Illinois at Chicago, Chicago, IL., Nov. 1, 1995, pp. 73–103.

Ewert, Richard H., *Gears and Gear Manufacture—The Manufacture*, Chapman & Hall, New York, 1997, pp. 2–32.

Litvin, Faydor L., *Gear Geometry and Applied Theory*, Prentice Hall, New Jersey, 1994, Chapter 9, pp. 258–287.

Litvin, Faydor L., *Gear Geometry and Applied Theory*, Prentice Hall, New Jersey, 1994, Chapter 11, pp. 490–525.

Litvin F.L., A.M. Egelja, and M. De Donno. "Computerized Determination of Singularities and Envelopes to Families of Contact Lines on Gear Tooth Surfaces." *Computer Methods in Applied Mechanics and Engineering*. (1998) pp. 23–34.

Litvin F.L., M. De Donno, Q. Lian, and S.A. Lagutin. "Alternative Approach for Determination of Singularity of Envelope to a Family of Parametric Surfaces." *Computer Methods in Applied Mechanics and Engineering*. (1998) pp. 153–165.

Litvin, F.L. and M. De Donno. "Computerized Design and Generation of Modified Spiroid Worm–Gear Drive with Low Transmission Errors and Stabilized Bearing Contact." *Computer Methods in Applied Mechanics and Engineering*. (1998) pp. 187–201.

*Primary Examiner*—Allan D. Herrmann
*Attorney, Agent, or Firm*—Woodard, Emhardt, Naughton, Moriarty & McNett

[57] ABSTRACT

A hybrid gear drive suitable for the transformation of motion and power between an involute worm and a face gear wherein the axis of the face gear and the worm may be crossed or intersected. The gear drive includes a multi-thread involute worm in meshing engagement with a face gear having helical teeth. The multi-thread involute worm threads each have a driving surface and a coasting surface formed in the profiles of the involutes of a pair of base circles having different radii. The gear drive allows practical gear ratios up to about ten for high speed, high load applications such as helicopter or automobile gearboxes.

31 Claims, 11 Drawing Sheets

HYBRID GEAR DRIVE

The present invention relates generally to the design and construction of a gear drive for the transformation of motion and power between a pinion and a face gear wherein the axes are crossed or intersected. More particularly, the present invention has an embodiment wherein the gear drive includes a multi-thread involute worm with different radii of base circles for both sides of the thread surfaces. Although the present invention was developed for use in automotive transmissions and gas turbine engine gearboxes, certain applications may be outside of these fields.

The use of gears to transmit motion and power from its shaft through another gear to its shaft is well known. With modern machine designers often seeking to increase the torque delivered to an output device it is desirable to improve the durability and interaction of gear drives. This is particularly true for a gas turbine engine powered aircraft where dependability and durability are related to flight worthiness. Gas turbine engines, for instance, include high speed rotating components including an output shaft revolving at speeds from about 5,000 to 50,000 revolutions per minute. Often, in order to harness the power from the gas turbine engine a gearbox is coupled to the engine output shaft to decrease the shaft rotation speed and increase the output torque.

Historically, designers of gearboxes for use with gas turbine engines have generally used multi-stage gearboxes to effectuate substantial shaft speed reduction. However, the gearbox design often created design parameter conflicts such as a need for a durable life gear train and the necessity to minimize the volume and weight of the gearbox. Therefore, the addition of a stage in order to increase a gear reduction ratio generally caused an increase in weight, an increase in unit manufacturing costs, and more complicated construction and alignment issues between gear sets.

In applications such as a helicopter gearbox transmission, a high total gear reduction ratio is needed between the engine and the final output shaft. Additionally, these gearboxes must be durable, lightweight, reliable and of a minimum size. Even with the variety of prior gear drives for gear reduction gearboxes there remains a need for an improved gear drive. The present invention satisfies this need in a novel and unobvious way.

SUMMARY OF THE INVENTION

One form of the present invention contemplates an apparatus, comprising: a face gear having a face gear axis, the face gear having a plurality of teeth; and, a multi-thread involute worm in meshing engagement with at least a portion of the plurality of teeth, each of the multi-threads has a driving surface formed at a first base circle with a first radius and a coast surface formed at a second base circle with a second radius, and wherein the first radius and the second radius are unequal and the worm has a worm axis that is not parallel with the face gear axis.

Another form of the present invention contemplates a combination, comprising: a gas turbine engine; a gear box coupled to the engine; and, a gear set positioned within the gear box, the gear set comprising a face gear having a face gear axis, and a plurality of face gear teeth; and a multi-thread involute worm in meshing engagement with the plurality of face gear teeth, each of the multi-threads has a driving surface formed at a first base circle with a first radius and a coast surface formed at a second base circle with a second radius, and wherein the first radius and second radius are unequal and the worm has a worm axis that is not parallel with the face gear axis.

Yet another form of the present invention contemplates a gear drive, comprising: a face gear having a face gear axis and a plurality of teeth; and, a multi-thread involute worm in meshing engagement with at least a portion of the plurality of teeth, each of the multi-threads has a driving surface with a first pressure angle and a coast surface with a second pressure angle, and wherein the first and second pressure angles are unequal and the worm has a worm axis that is not parallel with the face gear axis.

One object of the present invention is to provide an improved gear drive.

Further object features and advantages of the present invention will be apparent from the following description.

DESCRIPTION OF THE PREFERRED EMBODIMENT

For the purposes of promoting an understanding of the principles of the invention, reference will now be made to the embodiment illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Figure 1:
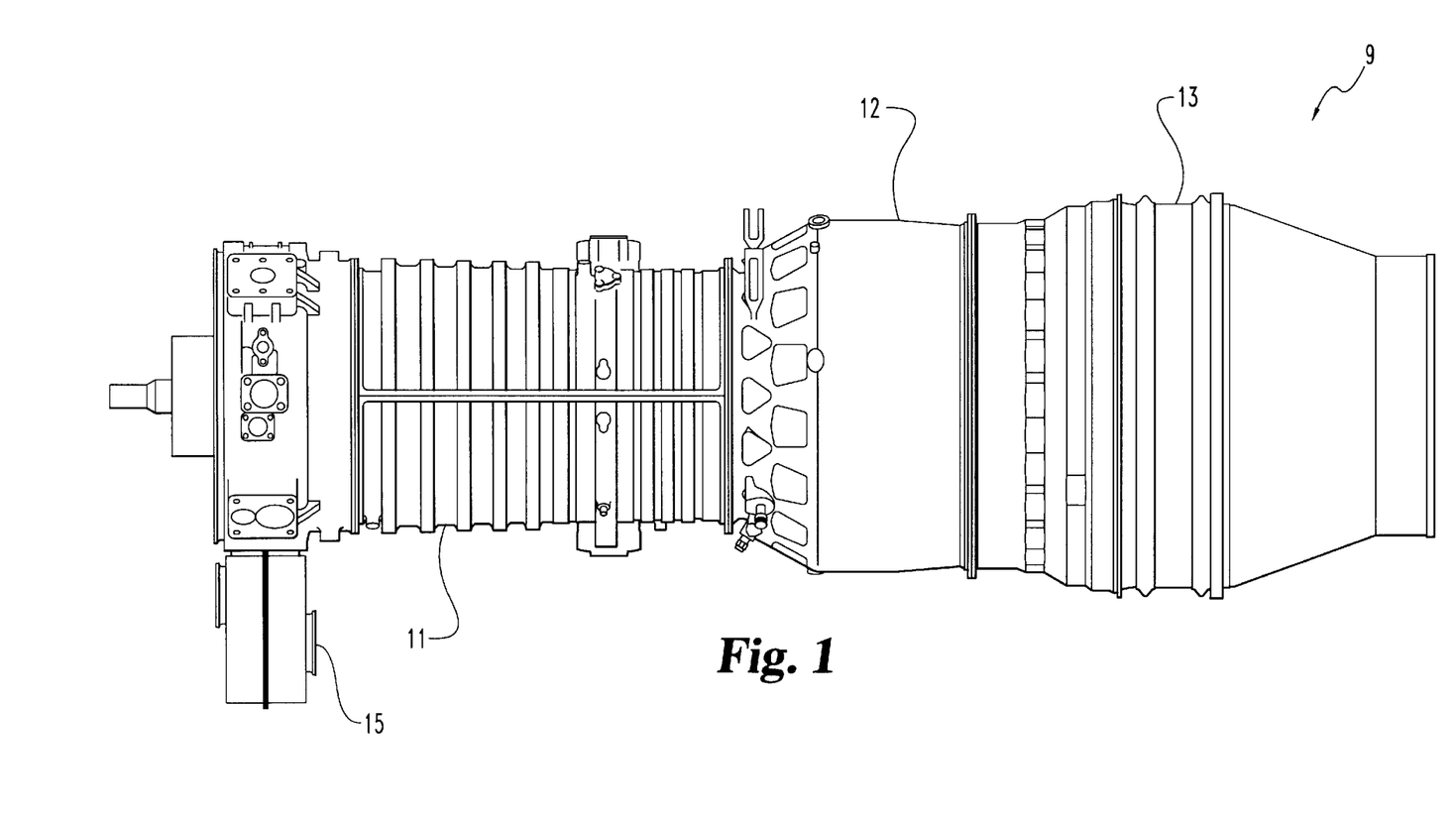
FIG. 1 is an illustrative view of a gas turbine engine and a gearbox with one embodiment of the gear drive of the present invention.
Figure 1A:
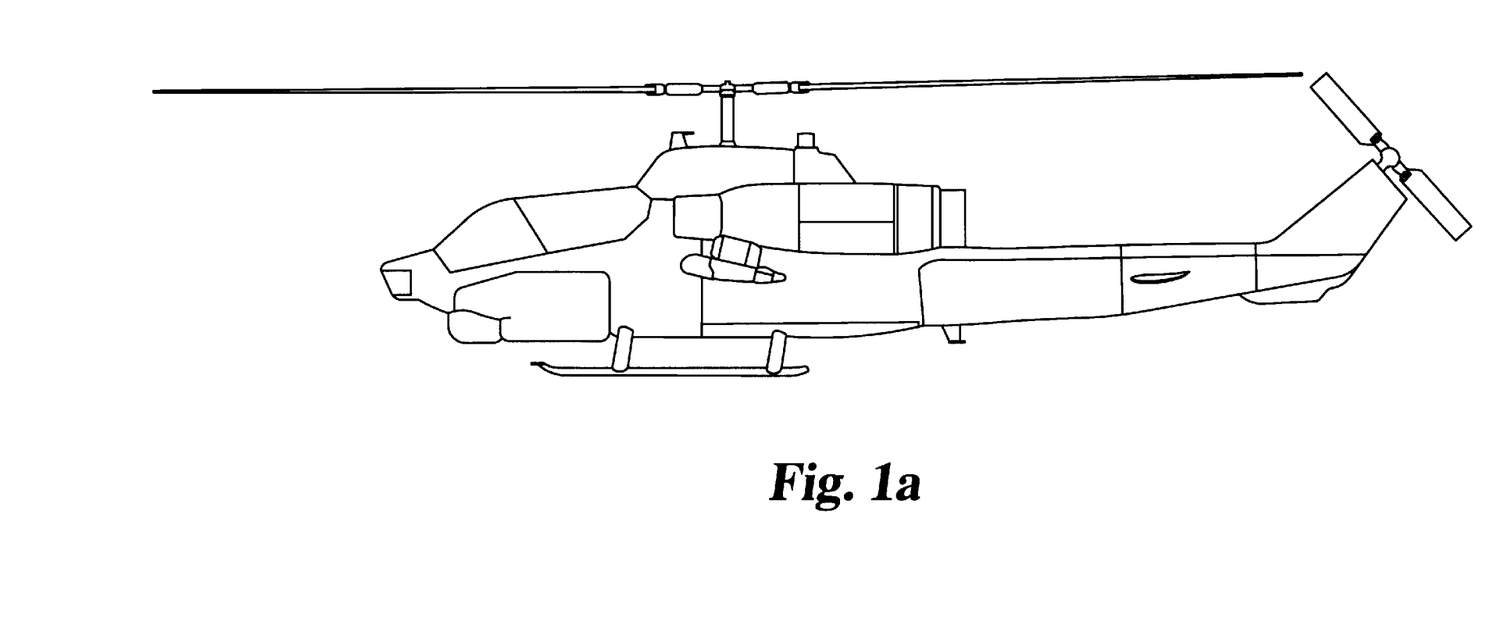
FIG. 1a is an illustrative view of a helicopter.

Referring to FIG. 1, there is illustrated one embodiment of an engine 9. More specifically, the engine 9 is preferably a gas turbine engine, however the engine could be other types of engines such as a gas or diesel internal combustion engine. It is understood that an aircraft is generic and includes helicopters, fighters, trainers, missiles, unmanned flight vehicles and other related apparatus. In a preferred embodiment, the flight propulsion engine 9 defines a gas turbine engine including a compressor 11 combustor 12 and a power turbine 13. A person of ordinary skill in the art will appreciate that there are multitudes of ways to link the components together. Additional compressors and turbines could be added, with intercoolers connecting between the compressors, and reheat combustion chambers could be added between the turbines. Further, a gas turbine engine is equally suited for industrial applications. Historically, there has been a widespread use of industrial gas turbine engines, such as pumping sets for gas and oil transmission lines, electricity generation, and naval propulsion.

A mechanical gearbox 15 contains a gear drive therein. The gearbox 15 is illustrated coupled to a shaft of the gas turbine engine 9, however the illustration of the gearbox 15 coupled to the gas turbine engine 9 is not meant to be limiting herein. The gearbox 15 could be coupled to a variety of devices such as, but not limited to, internal combustion engines, steam engines, water turbines, industrial manufacturing application lines, power generation systems, aircraft propulsion systems, jet driven aircraft, propeller driven aircraft, submarines, marine craft, and helicopter and automobile transmissions/gearboxes. While the gearbox 15 includes a mechanical housing for supporting and allowing the rotation of the gear drive therein. The term gearbox as used herein, unless specifically stated to the contrary, will include a fixed ratio speed change as well as a variable ratio speed change.

Figure 2:
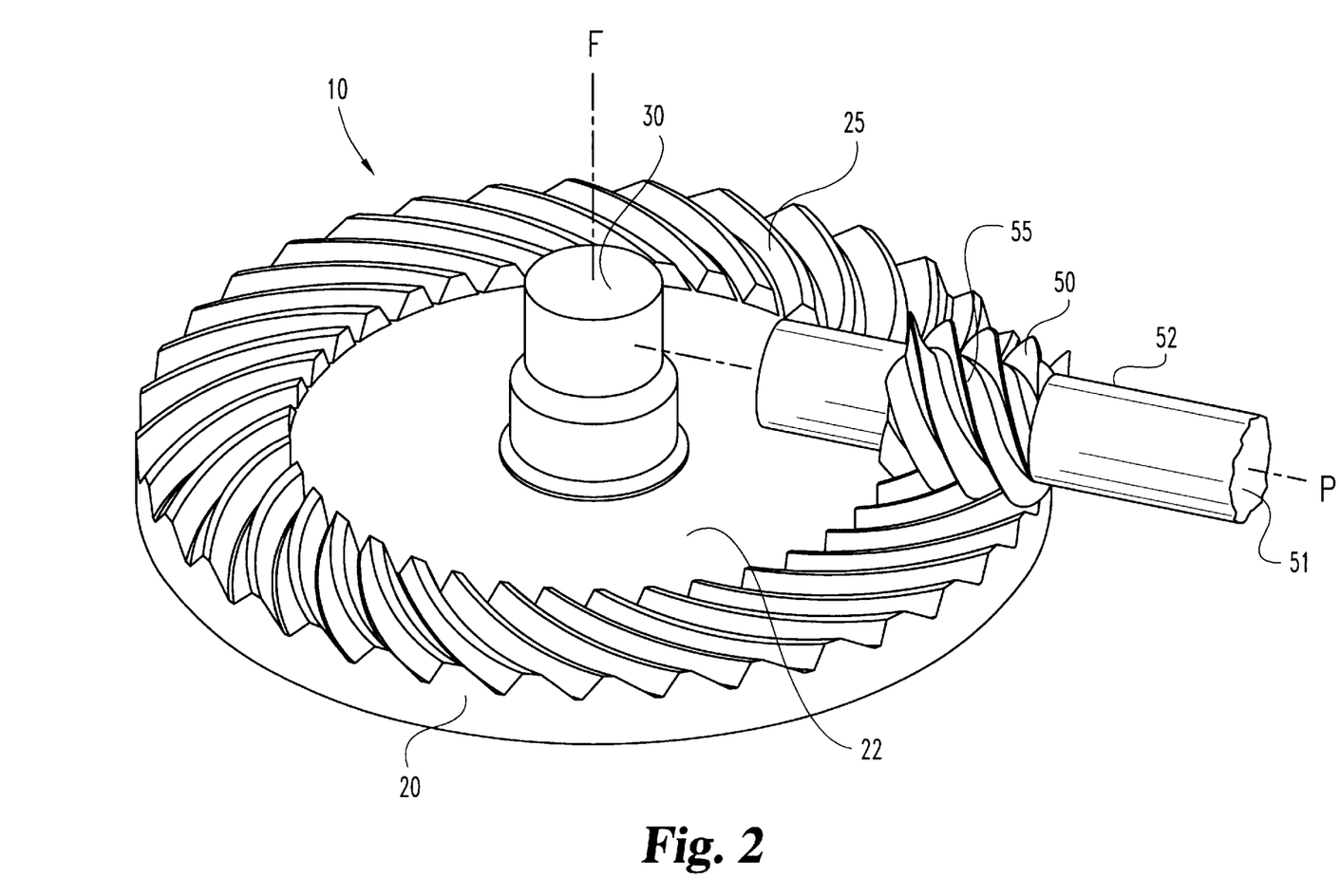
FIG. 2 is a perspective view of one embodiment of the FIG. 1 gear drive.
Figure 2A:
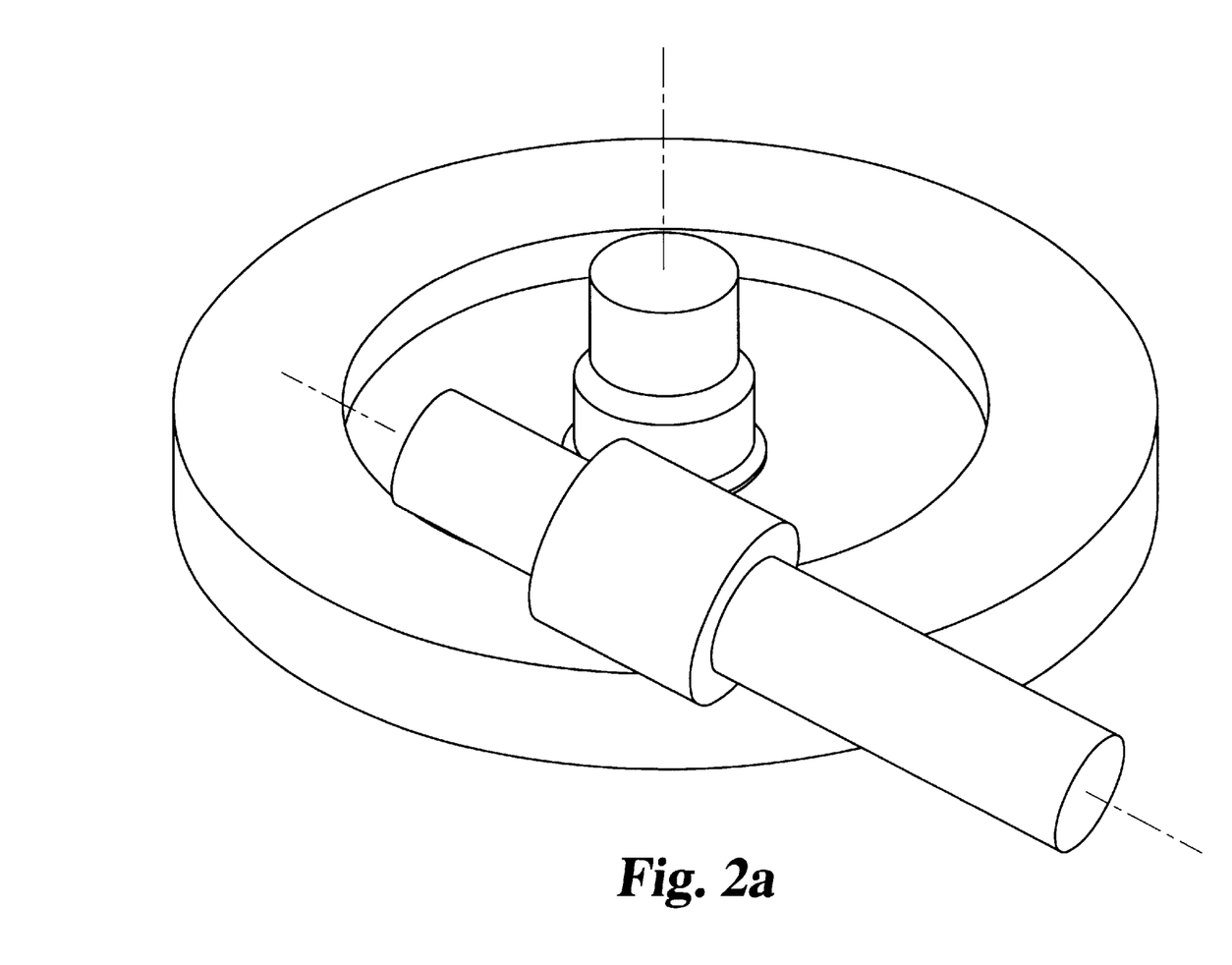
FIG. 2a is a perspective view of one embodiment of a crossed axis gear drive.

With reference to FIG. 2, there is illustrated a preferred embodiment of the gear drive 10. The gear drive 10 while having many diverse applications is well suited for high-power, high-load use such as is needed in helicopter and/or automotive gear boxes/transmissions. However, the gear drive of the present invention is not limited to high power, high load applications and is also contemplated for application having a wide variety of power and loads including low power and/or low load applications. The gear drive 10 includes a face gear 20 and a pinion 50. The pinion 50 is the smaller gear and preferably transmits the motion and power from the engine to drive the face gear 20, which in one embodiment is coupled, to an output shaft 30. The face gear 20 having a plurality of teeth 25, and in a preferred embodiment the teeth 25 are spiral teeth. More particularly, in one embodiment the pinion 50 is the driving link for causing rotation of the face gear 20. The pinion 50 is defined as a multi-thread involute worm, or an involute helical pinion, and in a preferred embodiment is formed with a plurality of helical threads 55 on a shaft 51. Furthermore, in a more preferred embodiment the pinion 50 defines a cylindrical multi-thread involute worm. The embodiment of FIG. 2 illustrates a gear drive having a worm 50 and a face gear 20, where the face gear axis 'F' and the pinion axis/worm axis 'P' are not parallel, and more specifically they are intersected. The present invention is not limited to an intersected axes design, rather the present invention contemplates a gear drive wherein the axis of the face gear and the pinion may be crossed (FIG. 2(a)) or intersected.

Figure 3:
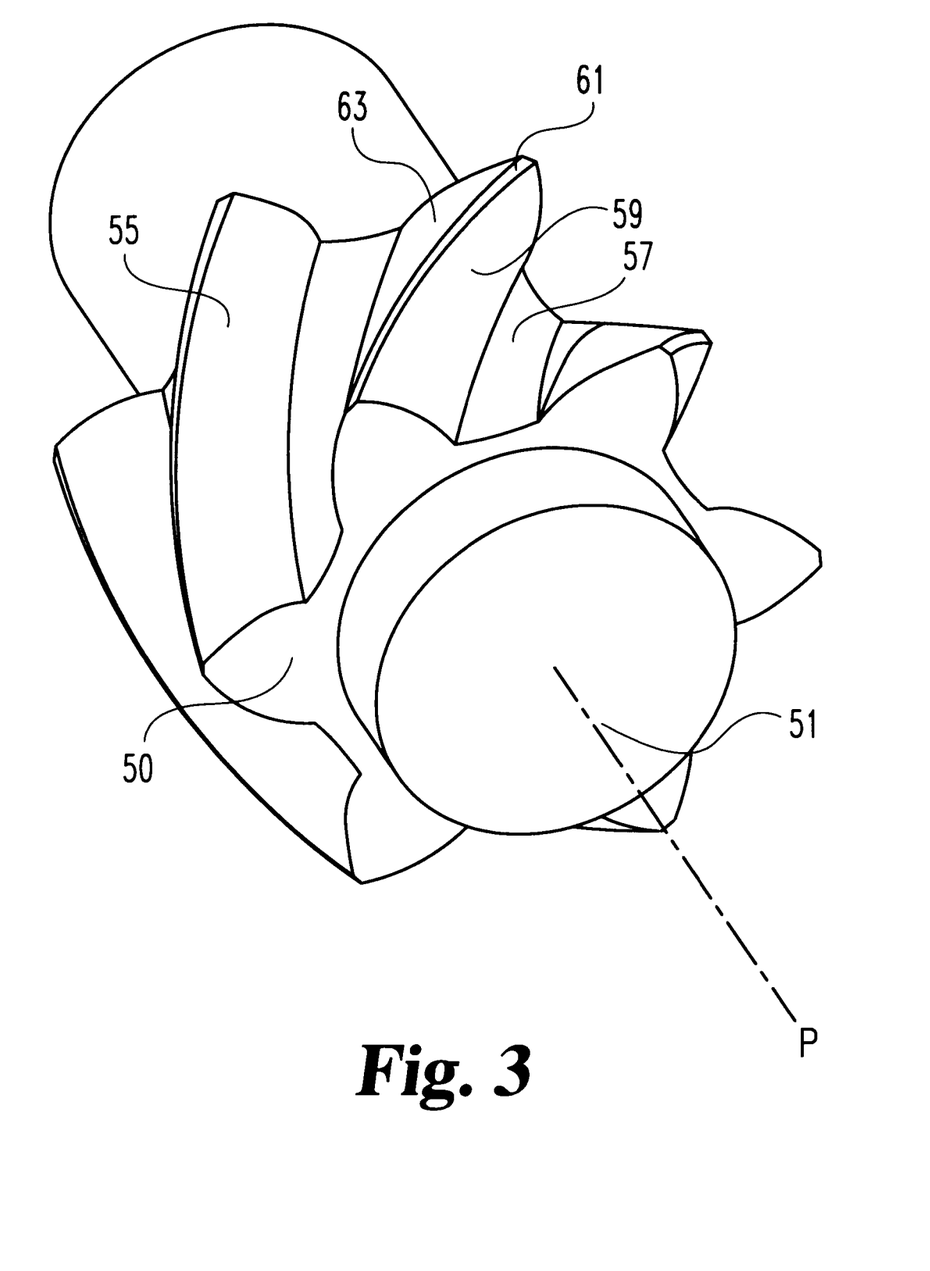
FIG. 3 is a partial perspective view of the multi-thread worm comprising a portion of the gear drive of FIG. 2.

Referring to FIG. 3, there is illustrated an enlarged perspective end view of one embodiment of the multi-thread involute worm 50. The plurality of helical threads 55 are formed on the pinion 50 and are designed and constructed for meshing engagement with the face-gear teeth 25. In the illustrated embodiment the number of threads 55 is six (6), however it is contemplated that for design flexibility it is not necessary to practice this particular number of threads 55.

Each worm thread 55 has a driving surface 59, a coast surface 63, a top land 61 therebetween, and a bottom land 57. The contact between the surfaces of each worm thread 55 and the surfaces of the face gear teeth 25 is localized and is a point contact at every instant. However, the contact under a load becomes spread over an elliptical area. Instead of an involute worm a helical involute pinion can be applied. The difference between the helical involute worm and the helical involute pinion are the tooth element proportions and the dimensions of pitch cylinders applied for the worm and the pinion. The present disclosure is set forth in relation to a worm, however the principles such as different pressure angles for the driving and coast side are equally applicable to the helical involute pinion.

Figure 4:
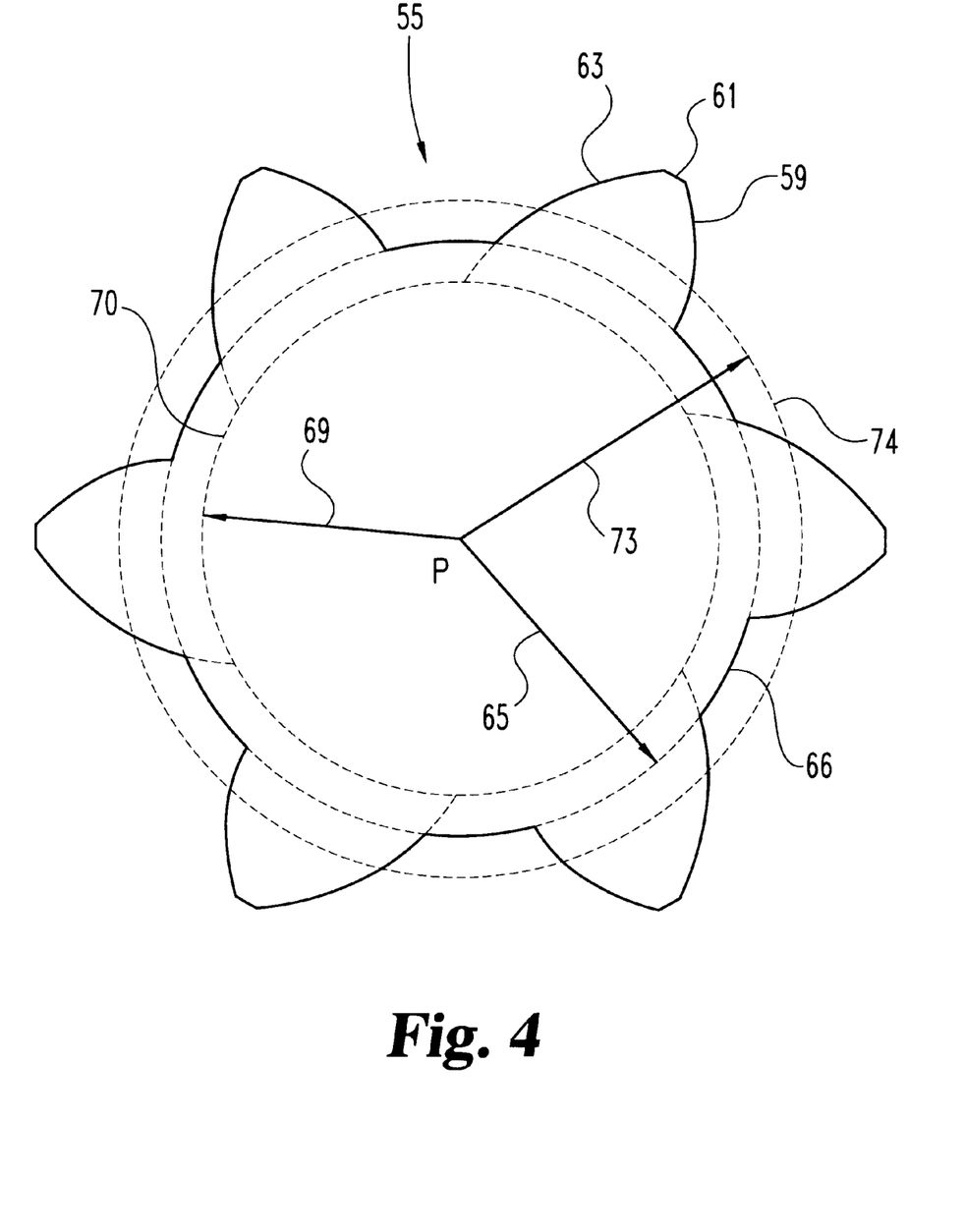
FIG. 4 is an illustrative view of the multi-thread worm of FIG. 3.

FIG. 4 provides an illustrative cross-sectional view of worm 50. The driving surface 59 is an involute profile that corresponds to a driving base circle 66 with a driving radius 65. The coast surface 63 is an involute profile that corresponds to a coast base circle 70 with a coast radius 69. The radii 65 and 69 are referenced from the pinion axis 'P'. The pitch circle is designated as 74 and has a pitch radius 73.

In the preferred embodiment, the pressure angle for the driving surface 59 and the pressure angle for the coast surface 63 are not equal. Therefore, the driving radius 65 of the base circle 66 is not equal to the coast radius 69 of the coast base circle 70. The application of different pressure angles for the driving side and the coast sides of the hybrid gear drive provide the possibility to: (1) have a more uniform top land of the face gear; (2) reduce the contact stresses in case of application of a larger pressure angle for the driving side; and (3) reduce the bending stresses due to application of a smaller pressure angle for the coast side. In the embodiment represented in FIG. 4, the pressure angle is smaller for the driving surface 59 in comparison with the pressure angle for the coast surface 63. More specifically, the driving radius 65 of the driving base circle 66 for the driving surface 59 profile is larger than the coast radius 69 of the coast base circle 70 for the coast surface 63 profile. It is understood herein that for design flexibility there are some applications in which the pressure angle for the driving surface 59 is chosen to be larger than the pressure angle for the coast surface 63. Associated therewith would be the coast radius 69 of the coast base circle 70 would be larger than the drive radius 65 of the drive base circle 66.

Figure 5A:
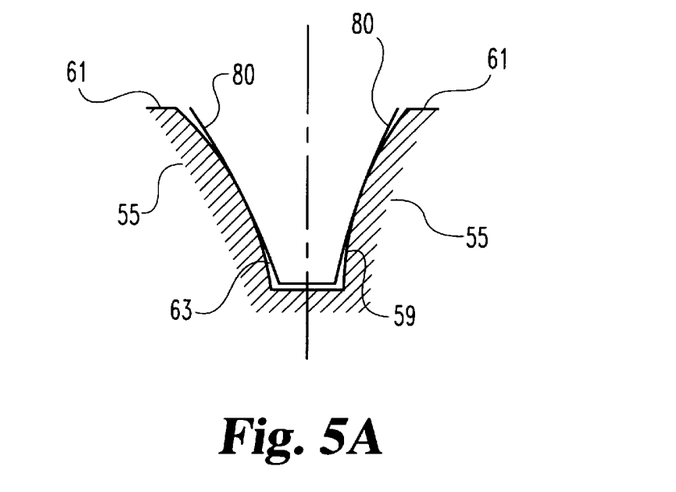
FIG. 5A is an illustrative axial profile view of a worm and hob utilized for generation of one embodiment of the face gear of the present invention.

With reference to FIG. 5A, there is illustrated that the axial profiles of a hob 80 deviate from the axial profiles of the driving surface 59 and coast surface 63. Crowning of the worm thread surfaces 59 and 63 in profile direction, with respect to the hob 80, enables instant point contact of the surfaces in mesh of the worm 55 with the face gear teeth 25. However, as discussed elsewhere herein a load may cause the contact to be spread from a point contact to an elliptical contact area.

Figure 5B:
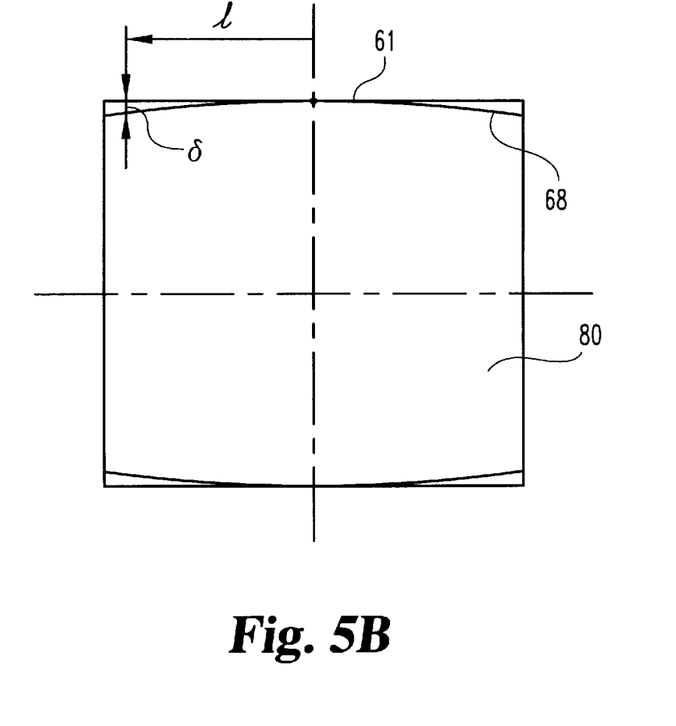
FIG. 5B is an illustrative longitudinal view of longitudinal crowning of the worm comprising one embodiment of the present invention.

Referring to FIG. 5B, there is illustrated the deviation of the worm surface with respect to the hob 80 surface in a longitudinal direction. Here, feature number 61 is the generatrix of the pitch cylinder of the hob 80. The deviation 6 of the worm surface is achieved by the plunging of the tool that generates the worm 50, where δ is a parabolic function. The parabolic function is:

$$\delta = a_{pl} l^2$$

where l is the longitudinal distance from the center of the thread and $a_{pl}$ is the parabola coefficient of the function at δ(1). The crowning of the worm in the longitudinal direction, with respect to the hob, enables one to obtain a predesigned parabolic function of transmission errors. In the preferred embodiment the threads 55 of the involute worm 50 are double crowned, that is the threads deviate from the hob surface in profile direction (FIG. 5A) and in the longitudinal direction (FIG. 5B).

An alternate approach to obtain localization of the surface contact when pinion 50 and face gear 20 are in mesh is through the application of an oversized involute hob to generate the gear. The oversized hob having an increased dimension in relation to the worm and more specifically an increased pitch diameter in comparison with the involute worm of the drive. Further, the hob is in internal tangency with the worm. The applied oversized involute hob also has different radii of the base circles of the driving and coast surfaces. Thus, the hob will have different pressure angles on the driving side and coast side. This application of an oversized hob is more fully described in the *Development of Gear Technology and Theory of Gearing*, by Faydor L. Litvin, NASA Reference Publication 1406, December 1997.

Figure 6A:
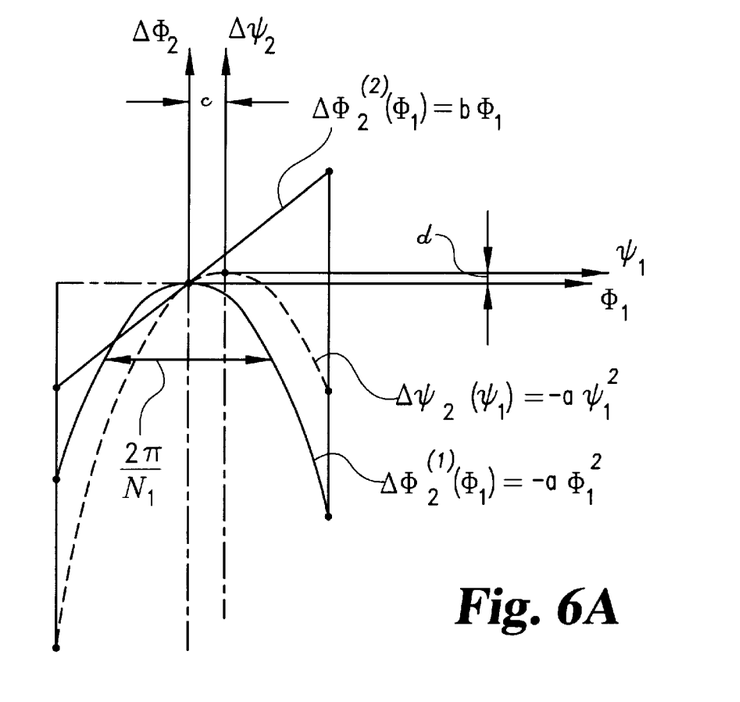
FIG. 6A is a chart illustrating the interaction of a parabolic function of transmission errors with a linear function.
Figure 6B:
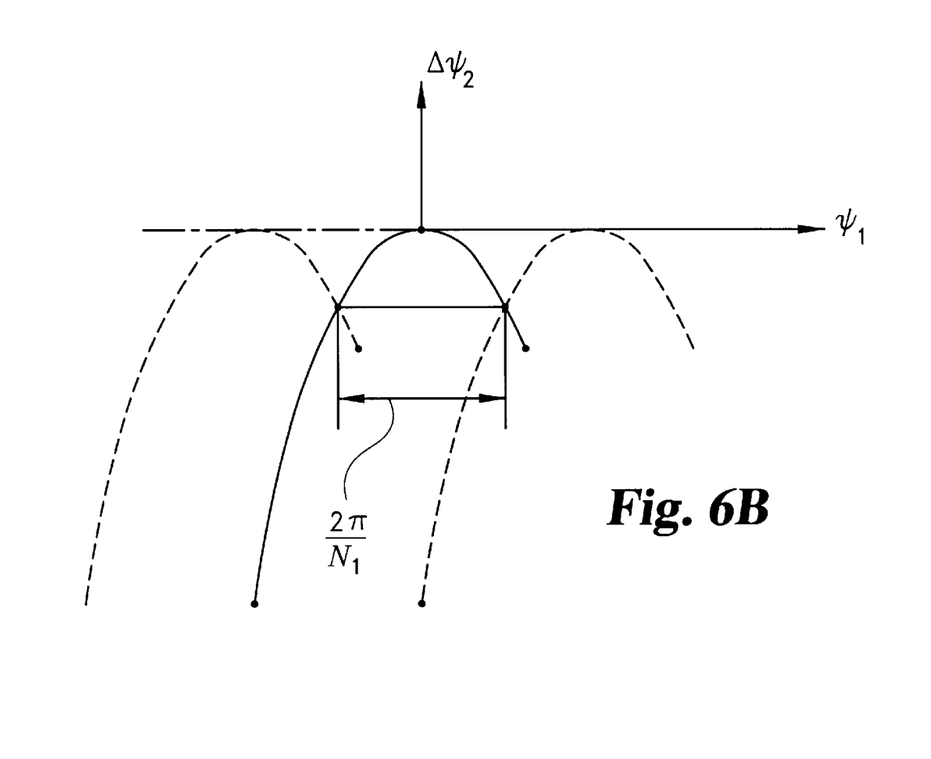
FIG. 6B is a chart illustrated the resulting function of transmission errors from the FIG. 6A functions.

The hybrid gear drive of the present invention provides the application of a predesigned parabolic function of transmission errors for the reduction of transmission errors caused by misalignment and transformation of the shape of caused transmission errors. With reference to FIG. 6A, there is represented the interaction of a predesigned parabolic function $\Delta\Phi_2^{(1)}(\Phi_1) = -a\,\Phi_1^2$ with the almost linear function of transmission errors $\Delta\Phi_2^{(2)}(\Phi_1) = b\,\Phi_1$ caused by misalignment. The sum of the functions $\Delta\Phi_2^{(1)}(\phi_1)$ and $\Delta\phi_2^{(2)}(\Phi_1)$ is the resulting function $\Delta\psi_2(\psi_1) = -a\psi_1^2$, where $\alpha$ is the same parabola coefficient as in the predesigned function $\Delta\Phi_2^{(1)}(\Phi_1)$. FIGS. 6A and 6B, illustrate that the linear function of transmission errors $\Delta\Phi_2^{(2)}(\Phi_1) = b\,\Phi_1$, caused by misalignment is absorbed. Therefore, the high vibration and noise caused by misalignment will be avoided. The possibility to provide the predesigned parabolic function is achieved due to the longitudinal crowning of the worm with respect to the hob as shown in FIG. 6B. Further information regarding the interaction of a predesigned parabolic function with a linear function is set forth in Chapter 9, pg. 258–287 of *Gear Geometry and Applied Theory*, by Faydor L. Litvin, Prentice Hall, 1994, which is hereby incorporated by reference. Referring to FIG. 6B, there is illustrated the resulting function of FIG. 6A relating to the linear function of transmission errors. In one embodiment of the present invention the gear drive 10 comprising of the face gear 20 and multi-thread involute worm 50 has about a zero value of transmission errors caused by gear misalignment.

The designations in FIGS. 6A and 6B, include $\Phi_1$, which indicates the angle of rotation of the worm 50 in mesh with the face gear 20. The symbol $\Delta\Phi_2$ indicates the transmission error of the face gear 20. Symbol a represents the parabola coefficient of the parabolic functions $\Delta\Phi_2(\Phi_1)$ and $\Delta\psi_2(\psi_1)$; and $N_1$ is the number of worm threads. Further, $\Phi_1 = 2\pi/N_1$ is the angle of the worm rotation for a cycle of meshing when one pair of face gear teeth is changed for another pair of face gear teeth.

Figure 7:
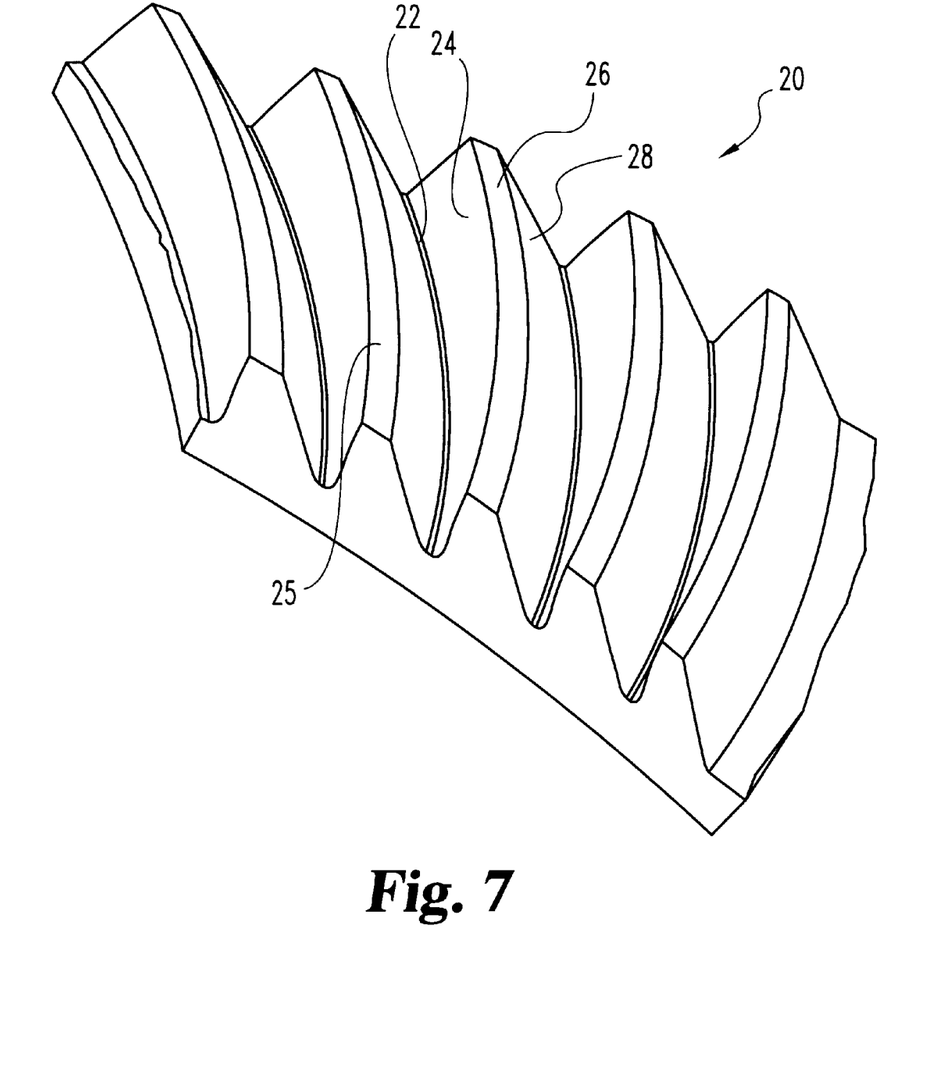
FIG. 7 is an enlarged partial view of the teeth of the face gear comprising a portion of the gear drive of FIG. 2.

With reference to FIG. 7, there is illustrated an enlarged portion of the face gear 20 with a plurality of face gear teeth 25 that are separated by the bottom lands 22. Each of the teeth 25 includes a coast surface 24, driven surface 28, and a top land 26. In the preferred embodiment the top land 26 of the face gear tooth 25 is substantially constant. More specifically, the top land 26 has a substantially constant width that results in the teeth 25 not being pointed.

A conventional face gear drive is practically limited to a ratio of up to five (5) for high speed, high load applications. A preferred form of the hybrid gear drive of the present invention allows higher gear ratios up to about ten (10). A range of the higher gear ratios is preferably from greater than (5) up to about ten (10), and more preferably from about eight (8) up to about ten (10). For example, the increase in gear ratios may require fewer stages in a helicopter gearbox.

Figure 8:
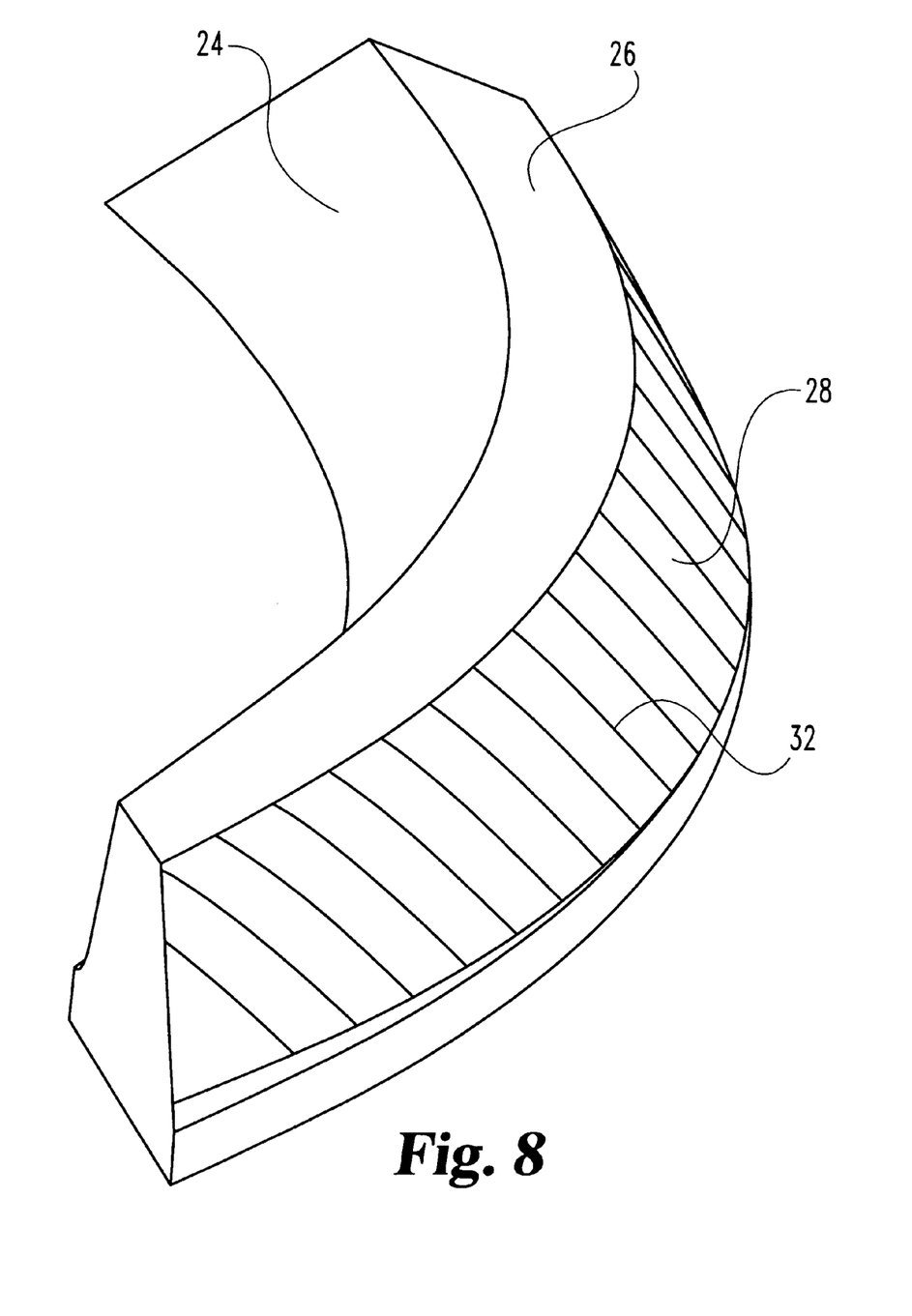
FIG. 8 is a partial perspective view of a face gear tooth comprising a portion of the face gear of FIG. 2., with lines of tangency shown between a hob and the face gear tooth surfaces.
Figure 9:
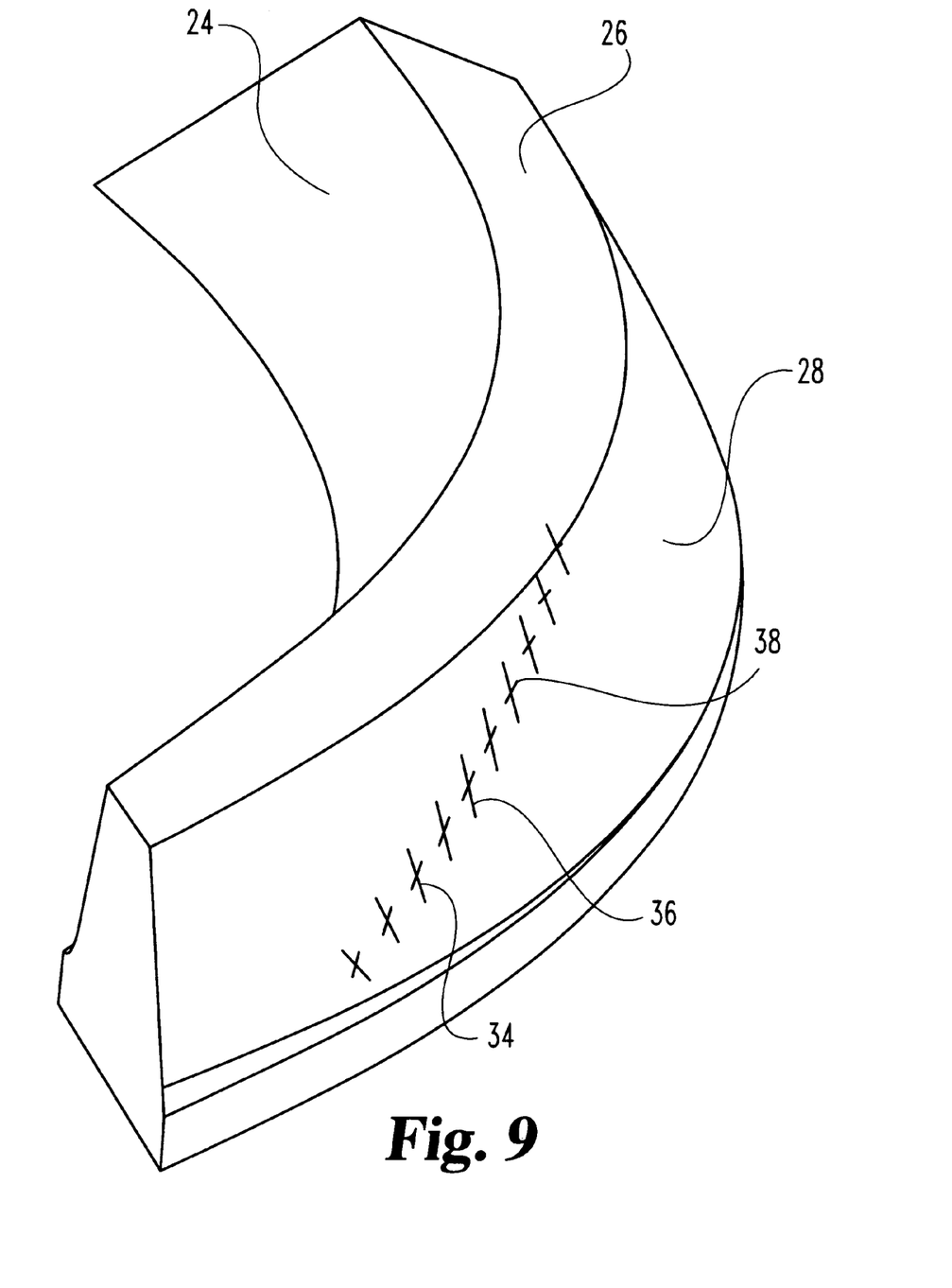
FIG. 9 is an illustrative view of the face gear tooth of FIG. 8 showing a path of contact on the driving side of the gear tooth surface as would occur when meshing with the worm.

With reference to FIGS. 8 and 9, there is illustrated a portion of the tooth surfaces of the teeth 25 of the face gear 20. The contact between the hob (not illustrated) and the gear blank during the manufacturing process is represented by the contact lines 32 on the driven surface 28. More specifically, with reference to FIG. 9, there is illustrated the localized bearing contact 34 between the threads 55 (not illustrated) of the worm 50 and the teeth 25 of the face gear 20. As discussed above in one embodiment, the localized bearing contact between the thread 55 and the face gear tooth surface is a point contact. We remind that due to deflection the point contact often will be spread out over an elliptical contact area. The orientation of a major axis 36 and a minor axis 38 of the contact ellipses on the face gear tooth surfaces are shown in FIG. 9. Several proposed hybrid gear drive designs are presented in Tables I–III.

The first example of a hybrid gear drive design covers the case of intersected axes of rotation and gear ratio N2/N1=6. The results of the computation are represented in Table I.

TABLE I

| Design parameters: | |
|---|---|
| Number of threads of the oversized hob | $N_h = 6$ |
| Number of threads of the involute worm | $N_1 = 6$ |
| Number of teeth of the hybrid gear | $N_2 = 36$ |
| Diametral pitch in axial section | $P = 5$ (1/in) |
| Shortest center distance | $E = 0$ (in) |
| Dimensions of the hybrid gear: | |
| Inner radius | $R_1 = 4.98$ (in) |
| Outer radius | $R_2 = 6.98$ (in) |
| Pressure angle in the axial section: | |
| Convex side | $\alpha_{cx} = 20°$ |
| Concave side | $\alpha_{cx} = 30°$ |
| Difference in the radii of the hob and worm pitch circles (oversize) | $r_{ph} - r_{pw} = 0.04$ (in) |
| Diameters of hob base circles: | |
| Convex side ($\alpha_{cx} = 20°$) | $r_{bcx} = 0.78315$ (in) |
| Convex side ($\alpha_{cv} = 30°$) | $r_{bcx} = 0.67599$ (in) |

The second example of a hybrid gear drive design covers the case of intersected axes of rotation and gear ratio $N_2/N_1 = 10$. The results of the computation are represented in Table II.

TABLE II

| Design parameters: | |
|---|---|
| Number of threads of the oversized hob | $N_h = 6$ |
| Number of threads of the involute worm | $N_1 = 6$ |
| Number of teeth of the hybrid gear | $N_2 = 60$ |
| Diametral pitch in axial section | $P = 5$ (1/in) |
| Shortest center distance | $E = 0$ (in) |
| Dimensions of the hybrid gear: | |
| Inner radius | $R_1 = 7.7$ (in) |
| Outer radius | $R_2 = 9.7$ (in) |
| Pressure angle in the axial section: | |
| Convex side | $\alpha_{cx} = 25°$ |
| Concave side | $\alpha_{cv} = 30°$ |
| Difference in the radii of the hob and worm pitch circles (oversize) | $r_{ph} - r_{pw} = 0.04$ (in) |

TABLE II-continued

Design parameters:

Diameters of hob base circles:

| | |
|---|---|
| Convex side ($\alpha_{cx} = 25°$) | $r_{bcx} = 0.73196$ (in) |
| Concave side ($\alpha_{cv} = 30°$) | $r_{bcv} = 0.67599$ (in) |

The third example of a hybrid gear drive design covers the case of crossed axes of rotation. The shortest center distance is E=1.25(in), and the gear ratio is $N_2/N_1=6$. The results of the computation are represented in Table III.

TABLE III

Design parameters:

| | |
|---|---|
| Number of threads of the oversized hob | $N_h = 6$ |
| Number of threads of the involute worm | $N_1 = 6$ |
| Number of teeth of the hybrid gear | $N_2 = 36$ |
| Diametral pitch in axial section | $P = 5$ (1/in) |
| Shortest center distance | $E = 1.25$ (in) |
| Dimensions of the hybrid gear: | |
| Inner radius | $R_1 = 3.6$ (in) |
| Outer radius | $R_2 = 5.6$ (in) |
| Pressure angle in the axial section: | |
| Convex side | $\alpha_{cx} = 20°$ |
| Concave side | $\alpha_{cv} = 30°$ |
| Difference in the radii of the hob and worm pitch circles (oversize) | $r_{ph} - r_{pw} = 0.04$ (in) |
| Diameters of hob base circles: | |
| Convex side ($\alpha_{cx} = 20°$) | $r_{bcx} = 0.78315$ (in) |
| Concave side ($\alpha_{cv} = 30°$) | $r_{bcv} = 0.67599$ (in) |

While the invention has been illustrated and described in detail in the drawings and description, these are to be considered as illustrative and not restrictive. It must be understood that only preferred embodiments have been shown and described and that all changes and modifications that come within the spirit of the invention are included where described by the following claims.

What is claimed is:

1. An apparatus, comprising:
   a face gear having a face gear axis, said face gear having a plurality of teeth; and
   a multi-thread involute worm in meshing engagement with a portion of said plurality of teeth, each of said multi-threads has a driving surface formed at a first base circle with a first radius and a coast surface formed at a second base circle with a second radius, and wherein said first radius and second radius are unequal and said worm has a worm axis that is not parallel with said face gear axis.

2. The apparatus of claim 1, wherein said multi-thread involute worm is an involute helical pinion.

3. The apparatus of claim 1, wherein said first radius is greater than said second radius.

4. The apparatus of claim 3, wherein said worm axis and said face gear axis are intersected.

5. The apparatus of claim 3, wherein said worm axis and said face gear axis are crossed.

6. The apparatus of claim 1, wherein each of said driving surfaces are formed in the profile of the involute of said first base circle, and wherein each of said coasting surfaces are formed in the profile of the involute of said second base circle.

7. The apparatus of claim 6, wherein said first radius is greater than said second radius, and wherein said multi-thread involute worm defines a pinion for driving said face gear.

8. The apparatus of claim 1, wherein each of said multi-threads of the worm are profile crowned with respect to a hob utilized for generation of said face gear.

9. The apparatus of claim 1, wherein each of said multi-threads of the worm are longitudinally crowned with respect to a hob utilized for generation of said face gear.

10. The apparatus of claim 1, wherein each of said multi-threads of the worm are profiled crowned and longitudinally crowned.

11. The apparatus of claim 1, wherein each of said plurality of teeth has a top land, and wherein said top land has a substantially constant width so as to limit pointing of said face gear.

12. The apparatus of claim 1, wherein:
   said multi-thread involute worm defines a pinion for driving said face gear;
   wherein each of said driving surfaces are formed in the profile of an involute of said first base circle, and wherein each of said coasting surfaces are formed in the profile of an involute of said second base circle, and wherein said first radius is greater than said second radius; and wherein each of said multi-threads are profile crowned and longitudinally crowned.

13. The apparatus of claim 12, wherein said gear ratio is in a range greater than five and up to about ten.

14. The apparatus of claim 12, wherein said gear ratio is from about eight to about ten.

15. The apparatus of claim 1:
   further including a gas turbine engine;
   further including a gear box coupled to said gas turbine engine; and
   wherein said face gear and said multi-thread involute worm are positioned within said gearbox.

16. The apparatus of claim 15, wherein:
   said multi-thread involute worm defines a pinion for driving said face gear;
   each of said driving surfaces are formed in the profile of an involute of said first base circle, and wherein each of said coasting surfaces are formed in the profile of an involute of said second base circle, and wherein said first radius is greater than said second radius; and
   wherein each of said multi-threads are profile crowned and longitudinally crowned.

17. A combination, comprising:
   a gas turbine engine;
   a gear box coupled to said engine; and
   a gear set positioned within said gear box, said gear set comprising: a face gear having a face gear axis, said face gear having a plurality of face gear teeth; and a multi-thread involute worm in meshing engagement with said plurality of face gear teeth, each of said multi-threads has a driving surface formed at a first base circle with a first radius and a coasting surface formed at a second base circle with a second radius, and wherein said first radius and second radius are unequal and said worm has a worm axis that is not parallel with said face gear axis.

18. The combination of claim 17, wherein said first radius is greater than said second radius.

19. The combination of claim 18, wherein each of said driving surfaces are formed in the profile of an involute of said first base circle, and wherein each of said coasting surfaces are formed in the profile of an involute of said second base circle.

20. The combination of claim 19, wherein said worm axis and said face gear axis intersect.

21. The combination of claim 19, wherein said worm axis and said face gear axis are crossed.

22. The combination of claim 19, which further includes a helicopter, and wherein the combination is attached to said helicopter.

23. A gear drive, comprising:

a face gear having a face gear axis and a plurality of teeth; and a multi-thread involute worm in meshing engagement with a portion of said plurality of teeth, each of said multi-threads has a driving surface with a first pressure angle and a coast surface with a second pressure angle, and wherein said first and second pressure angles are unequal and said worm has a worm axis that is intersected with said face gear axis.

24. The apparatus of claim 23, wherein each of said multi-threads of the worm are profile crowned and longitudinally crowned.

25. The apparatus of claim 24, wherein each of said plurality of teeth has a top land that has a substantially constant width.

26. The gear set of claim 23, which further includes a helicopter and wherein the gear set is coupled with said helicopter.

27. The gear set of claim 26, which further includes a gearbox coupled to said helicopter and wherein said gear set is disposed within said gear box.

28. A gear drive, comprising:

a face gear having a face gear axis and a plurality of teeth; and a multi-thread involute worm in meshing engagement with a portion of said plurality of teeth, each of said multi-threads has a driving surface with a first pressure angle and a coast surface with a second pressure angle, and wherein said second pressure angle is greater than said first pressure angle and said worm has a worm axis that is not parallel with said face gear axis.

29. The apparatus of claim 28:

wherein each of said worm multi-threads are profile crowned and longitudinally crowned;

wherein each of said teeth has a top land that has a substantially constant width; and the gear set has a gear ratio in a range greater than five and up to and including ten.

30. A gear drive, comprising:

a face gear having a face gear axis and a plurality of teeth; and a multi-thread involute worm in meshing engagement with a portion of said plurality of teeth, said worm has a cylindrical pitch surface, and said multi-threads has a driving surface with a first pressure angle and a coast surface with a second pressure angle, and wherein said first and second pressure angles are unequal and said worm has a worm axis that is not parallel with said face gear axis.

31. The gear drive of claim 30, wherein said worm axis and said face gear axis intersect.

\* \* \* \* \*

UNITED STATES PATENT AND TRADEMARK OFFICE
CERTIFICATE OF CORRECTION

PATENT NO : 6,128,969
DATED : October 10, 2000
INVENTORS : Faydor L. Litvin, Aleksandar Egelja and Inhwan Seol It is certified that error appears in the above-identified patent and that said Letters Patent are hereby corrected as shown below:

In Col. 4, line 58, replace "deviation 6" with -- deviation $\delta$ --.

In Col. 5, line 51, please change "Symbol a" with --Symbol $\alpha$ --.

In Col. 6, line 39, please change the parameter of Concave side from "$\alpha_{cx}$" with -- $\alpha_{cv}$ --.

Signed and Sealed this

Fifteenth Day of May, 2001

*Attest:*

NICHOLAS P. GODICI

*Attesting Officer*   *Acting Director of the United States Patent and Trademark Office*